United States Patent [19]
Mori et al.

[11] 3,862,573
[45] Jan. 28, 1975

[54] METHOD AND APPARATUS FOR MEASURING TEMPERATURE DIFFERENCE AT SPACED POINTS ON METAL SURFACES

[75] Inventors: Toshihiro Mori; Takeo Yamada, both of Yokohama; Katsujiro Watanabe, Tokyo, all of Japan

[73] Assignee: Nippon Kokan Kabushiki Kaisha, Tokyo, Japan

[22] Filed: Nov. 20, 1972

[21] Appl. No.: 307,806

[30] Foreign Application Priority Data
Nov. 29, 1971 Japan.............................. 46-96185

[52] U.S. Cl..................................... 73/342, 73/362
[51] Int. Cl. ............................................. G01k 7/02
[58] Field of Search..... 73/362 R, 342, 67.2, 339 A, 73/517 AV; 331/66

[56] References Cited
UNITED STATES PATENTS
1,990,085  2/1935  Mudge et al..................... 73/362 R
3,186,226  6/1965  Milnes et al. ..................... 73/339 A
3,421,374  1/1969  Wieting et al. ........................ 331/66

*Primary Examiner*—Donald O. Woodiel
*Attorney, Agent, or Firm*—Flynn & Frishauf

[57] ABSTRACT

In an apparatus for measuring the temperature difference between two spaced apart points on the surface of a metal body by means of oscillation type noncontacting thermometers, there are provided a pair of oscillators each including respective detecting coils which are spaced apart with a predetermined spacing along the surface of the metal body and disposed close thereto, means for producing a signal corresponding to the complement of the ratio of the output frequencies of the oscillators or to the difference between the output frequencies; a digital-to-analogue converter for converting the signal to an analogue signal and a multiplier for multiplying the output of the digital-to-analogue converter by a constant or by the temperature coefficient of frequency, thereby generating an output signal which is a function of said temperature difference.

12 Claims, 3 Drawing Figures

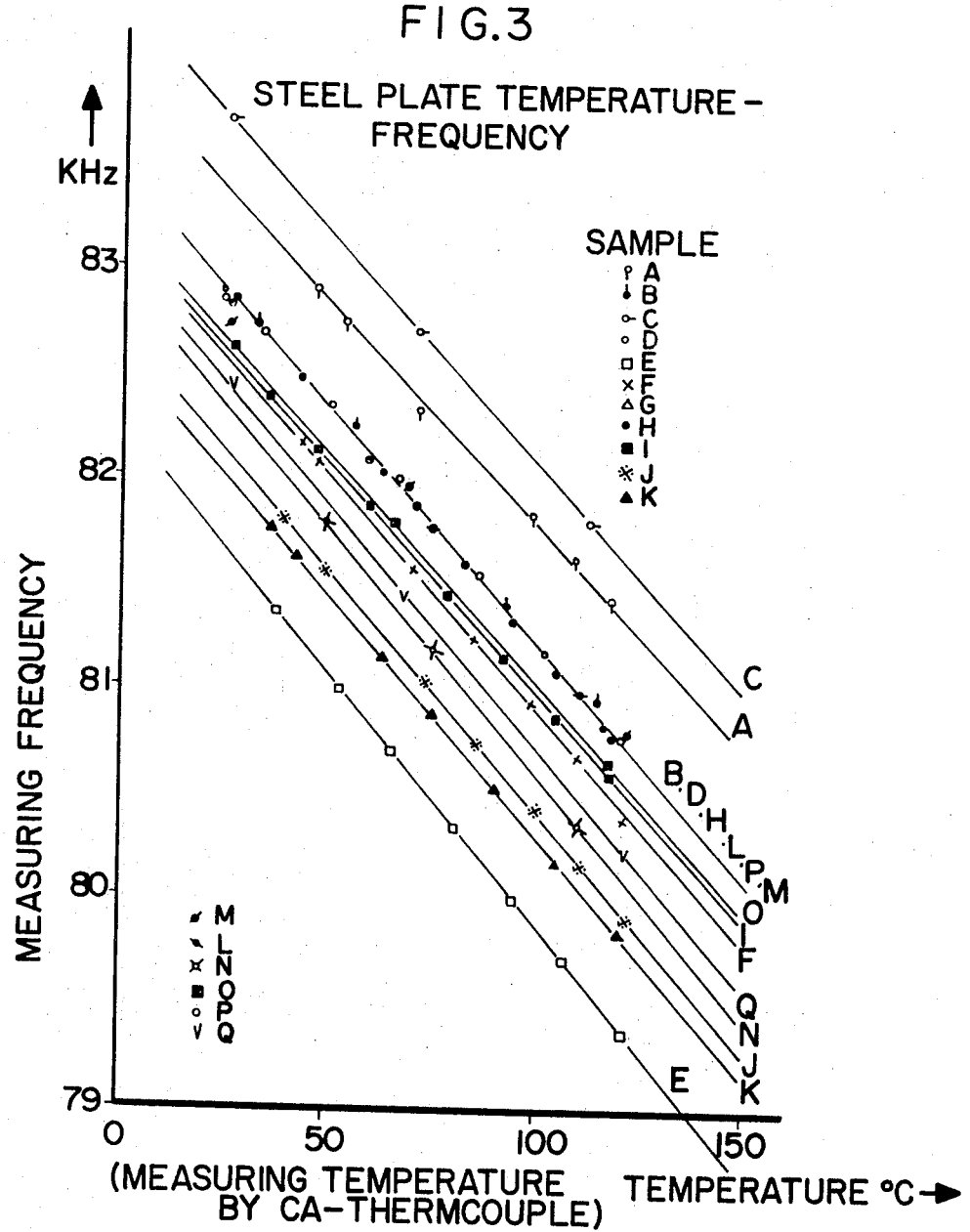

METHOD AND APPARATUS FOR MEASURING TEMPERATURE DIFFERENCE AT SPACED POINTS ON METAL SURFACES

BACKGROUND OF THE INVENTION

This invention relates to a method and apparatus for measuring the temperature difference at different points on a metal surface by using an oscillating type noncontacting thermometer.

Prior methods of measuring temperatures of metal surfaces include a method wherein a radiation thermometer is used and a method wherein an oscillation type noncontacting thermometer is used. Although the former method has a relatively high accuracy in a range of temperature measurement exceeding 400° C, in a temperature range of less than 200° C, the accuracy of measurement decreases greatly because infrared rays are used. Especially, as the coefficient of radiation of metal surfaces is small in the infrared ray region, the measurement error is large. Further, with the latter method it is necessary to use different frequency-temperature calibration curves for different materials so that it is necessary to compensate for the result of measurement in accordance with the variation in the composition, hardness, etc. of the metal.

Accordingly it is an object of this invention to provide a new and improved temperature difference measuring method and apparatus capable of measuring the temperature difference at two points along the surface of a metal body in a low temperature range at higher accuracies than prior art devices.

Another object of this invention is to provide a novel method and apparatus capable of accurately measuring the temperature difference at two points along the surface of a metal body irrespective of the type of the metals and carbon content thereof so long as they have substantially the same electric conductivity and temperature coefficient of magnetic permeability.

SUMMARY OF THE INVENTION

According to one aspect of this invention, there is provided apparatus for measuring the temperature difference between two spaced apart points on the surface of a metal body by means of oscillation type noncontacting thermometers, characterized in that there are provided a pair of oscillators each including respective detecting coils, said coils being spaced apart with a predetermined spacing along the surface of the metal body and disposed close thereto, means for producing a signal corresponding to the complement of the ratio of the output frequencies of the oscillators or to the difference between the output frequencies, a digital-to-analogue converter for converting the signal to an analogue signal and a multiplier for multiplying the output of the digital-to-analogue converter by a constant or by the temperature coefficient of frequency, thereby generating an output signal which is a function of said temperature difference.

According to another aspect of this invention, there is provided a method of measuring the temperature differential between two spaced apart points on the surface of a metal body by means of oscillation type noncontacting thermometers, characterized by the steps of disposing a pair of temperature sensitive coils of a pair of oscillators close to the surface, producing a signal corresponding to the complement of the ratio of the output frequencies of the oscillators or to the difference between the output frequencies, effecting a digital-to-analogue conversion of the signal and multiplying the converted signal by a constant or by the temperature coefficient of frequency to generate an output signal which is a function of said temperature difference.

BRIEF DESCRIPTION OF THE DRAWINGS

FIG. 3 is a graph showing the relationship between temperature and frequency of various samples.

DESCRIPTION OF THE PREFERRED EMBODIMENT

Figure 1:
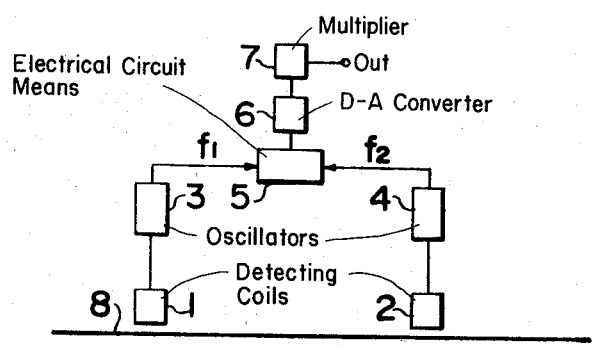
FIG. 1 shows a block diagram of apparatus used to carry out the method of this invention.

The measuring apparatus shown in FIG. 1 comprises oscillators 3 and 4 respectively including noncontacting detecting or temperature sensitive coils 1 and 2, and a circuit 5 which is constructed to produce, for example, a complement $(1 - f_1/f_2)$ of the ratio $f_1/f_2$ between oscillation frequencies $f_1$ and $f_2$ of oscillators 3 and 4 or the difference $f_1 - f_2$. The circuit 5 may comprise frequency counters and a calculating unit, the output of which is supplied to a multiplier 7 through a digital-to-analogue converter 6. As diagrammatically shown, the detection coils 1 and 2 of the noncontacting type thermometers are spaced apart with a definite spacing and disposed close to the surface of a metal body 8 but not so close as to contact it.

Before use, oscillators 3 and 4 are adjusted to operate at the same frequency, or $f_1 = f_2$, for the same material, temperature and spacing. Detection coils 1 and 2 are positioned to face the surface of sample 8 at two spaced apart points along a line of rolling or surface treatment whose temperature difference is to be measured. The complement $(1 - f_1/f_2)$ of the ratio of the oscillation frequencies $f_1$ and $f_2$ of the oscillators 3 and 4 or the difference $(f_1 - f_2)$ is derived by circuit 5 and this output is converted into an analogue signal by the operation of the digital-to-analogue converter 6. The analogue signal is multiplied by a suitable constant (in the case of the complement of the frequency ratio) or the temperature coefficient of frequency (in the case of the frequency difference) by the operation of the multiplier 7 to produce an output proportional to the temperature difference between the two points.

Figure 2:
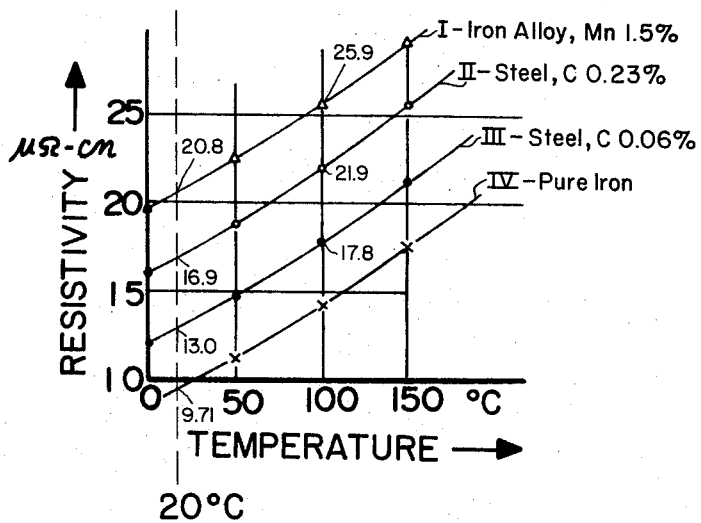
FIG. 2 is a graph showing the relationship between the electric resistivity, and temperature of iron, steel and an iron alloy.

As shown in FIG. 2, even when a small quantity of different metal is alloyed with a pure metal, the temperature coefficients of electric resistivity of such alloys are substantially the same as that of the pure metal. More particularly, curves I to IV of FIG. 2 show the relationship between the resistivity in terms of microhm-cm and the temperature (°C) and the inclinations of these curves show the temperature coefficient of resistivity. For this reason, as shown by the curves A to Q of FIG. 3 which were plotted by using experimental data, where steel plates of different type, carbon content and hardness are measured with an oscillation type noncontacting thermometer, the temperature coefficients of frequency of these different samples are the same. Consequently, even when respective steel sheets passed through the processing line are of a different type, carbon content and hardness it is possible to measure the temperature difference $T_{12}$ between two measuring points according to the following equations without the necessity of changing the coefficient of the multiplier.

$$T_{12} = k \cdot (1 - f_1/f_2) \text{ or}$$

$$T_{12} = a^{-1} (f_2 - f_1) \text{ where}$$

$k$: a constant
$a$: the temperature coefficient of frequency
$f_1, f_2$: the oscillation frequencies of oscillators 3 and 4, respectively.

Equation 1 is used when the complement $(1 - f_2/f_1)$ is applied to multiplier 7 and equation 2 is used when the difference $(f_2 - f_1)$ is applied.

As above described, this invention provides a method and apparatus for measuring the temperature difference between two points, wherein a pair of detection coils of oscillation type oncontacting thermometers are disposed to confront the two points which are spaced apart at a definite distance along the surface of metal bodies having substantially the same electric conductivity and temperature coefficient of permeability, a signal corresponding to the complement of the ratio between the output frequencies of the oscillators or to the difference between these output frequencies is derived, the signal is converted by a digital-to-analogue converter, into an analogue signal, and the converted signal is multiplied by a suitable constant of the tempeerature coefficient of frequency, thereby the temperature difference between the two points being measured. According to this invention, it is possible to measure the temperature difference in a low temperature range (from normal temperature to about 300° C) at an extremely higher accuracy than the conventional noncontacting type temperature measuring apparatus. Further, it is possible to measure the temperature difference at two points on the surface of iron bodies irrespective of the type of the iron bodies and their carbon content. When one of the coils is located at such a point at which the temperature of the object can be readily measured by another type of thermometer, for example, of the contact type or at which it is possible to readily presume the temperature of the object and when the temperature measured by said one coil is added to the measured temperature difference, it is possible to readily measure the actual temperature.

What we claimed is:

1. Apparatus for measuring the temperature difference of the surface of a metal body comprising:
 a pair of oscillators including detecting coils, said detecting coils being spaced apart with a predetermined spacing along said surface of the metal body and disposed close to but not touching said surface, said coils having a characteristic which varies with temperature changes in the surface of the metal body disposed close thereto, and the respective output signals of said oscillators having frequencies $(f_1/f_2)$ which are a function of said temperature variable characteristic of said detecting coils;
 electrical circuit means for producing a signal corresponding to the complement $(1-f_1/f_2)$ of the ratio $(f_1/f_2)$ of the frequencies of the output signals of said oscillators; and
 a multiplier coupled to said electrical circuit means for multiplying the complement signal by a constant, thereby generating an output signal which is a function of said temperature difference.

2. Apparatus for measuring temperature difference of the surface of a metal body comprising:
 a pair of oscillators including detecting coils, said detecting coils being spaced apart with a predetermined spacing along said surface of the metal body and disposed close to but not touching said surface, said coils having a characteristic which varies with temperature changes in the surface of the metal body disposed close thereto, and the respective output signals of said oscillators having frequencies $(f_1, f_2)$ which are a function of said temperature variable characteristic of said detecting coils; electrical circuit means for producing a signal $(f_1-f_2)$ corresponding to the difference between the frequencies of the output signals $(f_1, f_2)$ of said oscillators; and
 a multiplier coupled to said electrical circuit means for multiplying the difference signal by a value corresponding to the temperature coefficient of frequency variations, thereby generating an output signal which is a function of said temperature difference.

3. The apparatus according to claim 1 wherein said electrical circuit means comprises a counter.

4. The apparatus according to claim 2 wherein said electrical circuit means comprises a counter.

5. The apparatus according to claim 1 wherein said metal body comprises steel sheets having substantially the same electric conductivity and the temperature coefficient of magnetic permeability.

6. The apparatus according to claim 2 wherein said metal body comprises steel sheets having substantially the same electric conductivity and the temperature coefficient of magnetic permeability.

7. A non-contact-type method of measuring the temperature difference between two spaced apart points on the surface of a metal body, comprising:
 disposing a pair of spaced apart detecting coils of a pair of oscillators close to said surface, said coils having a characteristic which varies with temperature changes in said surface, and the respective output signals of said oscillators having frequencies $(f_1, f_2)$ which are a function of said temperature variable characteristic of said detecting coils;
 producing a signal corresponding to the complement $(1-f_1/f_2)$ of the ratio $(f_1/f_2)$ of the frequences of the output signals of said oscillators; and
 multiplying the complement signal by a constant to produce an output signal which is a function of said temperature difference.

8. A non-contact-type method of measuring the temperature difference between two spaced apart points on the surface of a metal body, comprising:
 disposing a pair of spaced apart detecting coils of a pair of oscillators close to said surface, said coils having a characteristic which varies with temperature changes in said surface, and the respective output signals of said oscillators having frequencies $(f_1, f_2)$ which are a function of said temperature variable characteristic of said detecting coils;
 producing a signal corresponding to the difference $(f_1-f_2)$ between the frequencies of the output signals $(f_1, f_2)$ of said oscillators; and
 multiplying the difference signal by a value corresponding to the temperature coefficient of frequency variations to produce an output signal which is a function of said temperature difference.

9. The apparatus according to claim 1 wherein the electrical circuit means provides a digital output signal, and further comprising a digital-to-analogue converter coupled between said electrical circuit means and said multiplier for converting the output of said electrical circuit means into an analogue signal.

10. The apparatus according to claim 2 wherein the electrical circuit means provides a digital output signal and further comprising a digital-to-analogue converter coupled between said electrical circuit means and said multiplier for converting the output of said electrical circuit means into an analogue signal.

11. A method according to claim 7 wherein said complement signal is a digital signal and further comprising converting said digital signal to an analogue signal prior to said multiplying step.

12. A method according to claim 8 wherein said difference signal is a digital signal and further comprising converting said digital signal to an analogue signal prior to said multiplying step.

* * * * *